C. T. WESTLAKE.
CAR TRUCK.
APPLICATION FILED NOV. 26, 1917.
1,275,340.
Patented Aug. 13, 1918.
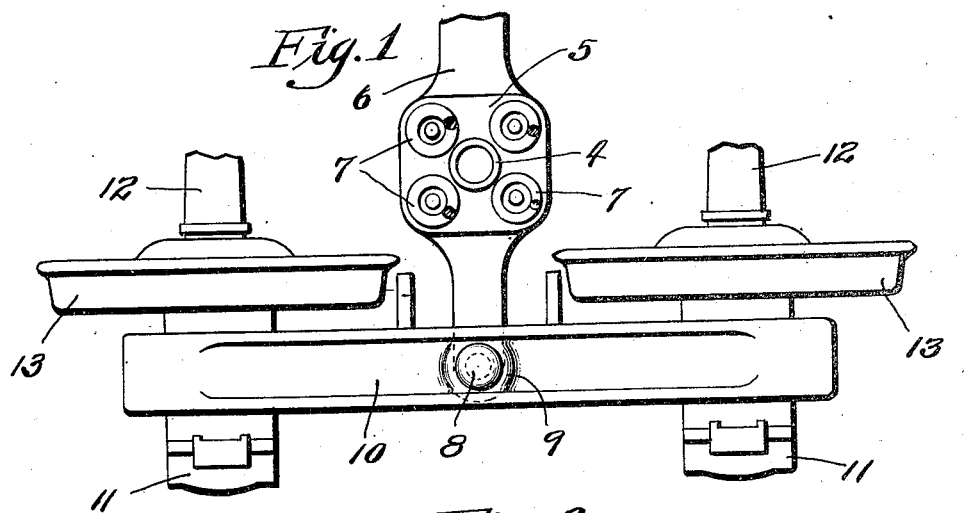
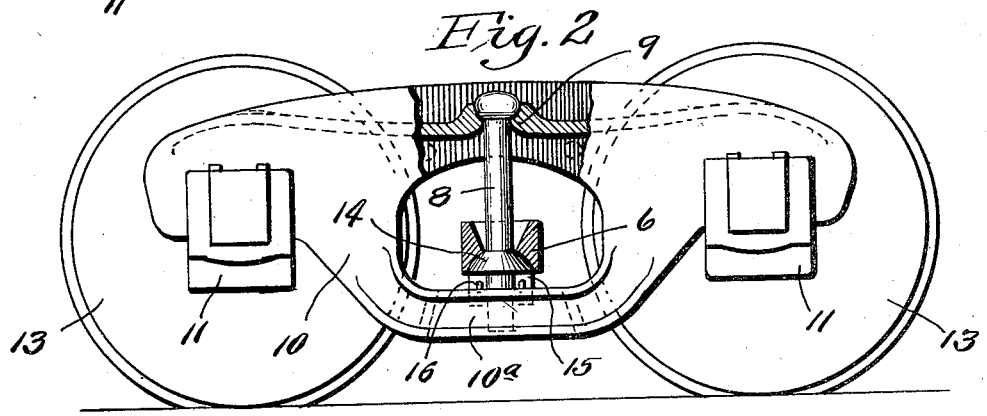
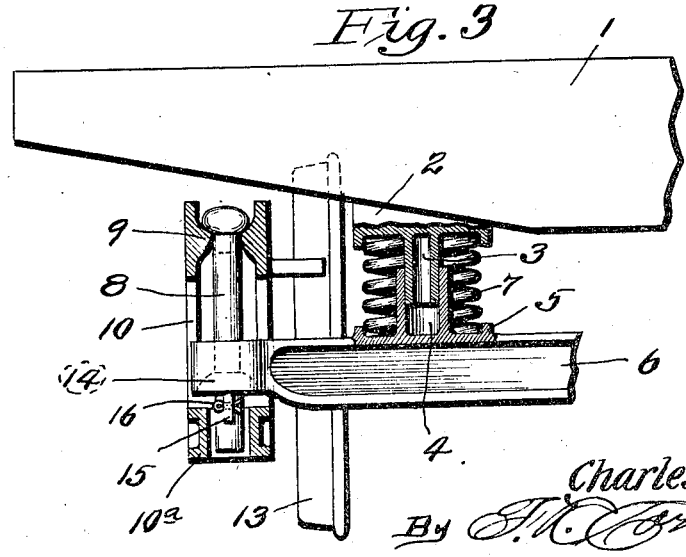
Inventor
Charles T. Westlake

UNITED STATES PATENT OFFICE.

CHARLES T. WESTLAKE, OF ST. LOUIS, MISSOURI, ASSIGNOR TO COMMONWEALTH STEEL COMPANY, OF ST. LOUIS, MISSOURI, A CORPORATION OF NEW JERSEY.

CAR-TRUCK.

1,275,340.

Specification of Letters Patent.   Patented Aug. 13, 1918.

Application filed November 26, 1917. Serial No. 204,084.

*To all whom it may concern:*

Be it known that I, CHARLES T. WEST-LAKE, a citizen of the United States, residing at city of St. Louis, State of Missouri, have invented a certain new and useful Improvement in Car-Trucks, of which the following is a full, clear, and exact description, such as will enable others skilled in the art to which it appertains to make and use the same, reference being had to the accompanying drawings, forming part of this specification, in which—

Figure 1 is a plan view of one side of my improved car truck.

Fig. 2 is a side elevational view partly in section.

Fig. 3 is a cross sectional view.

This invention relates to a new and useful improvement in car trucks, the principal objects of my invention being to generally improve upon the existing types of car trucks; to simplify the construction thereof and to reduce the cost of manufacture.

With the foregoing and other objects in view, my invention consists in certain novel features of construction and arrangement of parts, hereinafter more fully described and claimed.

In the drawings, 1 indicates a body bolster or similar part of the car underframe which is provided with or has attached thereto a spring seat 2, which spring seat has a pin or boss 3 arranged in telescopic relation to a male or female pin or boss 4 extending over a spring seat 5 arranged on the truck bolster 6. 7 are the supporting springs interposed between the spring seats for supporting the car body and its load, there being a set of these springs at each of the four corners of the car,—thus dispensing with the usual center bearings and by so doing lightening the weight of the truck bolster. The ends of the truck bolster are suspended upon the hanger pins 8, whose heads are preferably rounded and seated in recessed bosses 9 of the truck side frames 10. These truck side frames have journal boxes 11 fixed thereon in which journal boxes are mounted the usual axles 12 on which are arranged the wheels 13.

The truck bolster 6 at each end is provided with a spherical bearing seat above which the walls are cut away so as to permit a universal movement of the suspending hanger pin 8, the walls of the truck side frame under the recessed boss 9 being similarly cut away to permit the hanger to swing. The spherical shaped collar 14 on the hanger pin is preferably removable and held in place by a cross pin or bar 15, the latter being prevented from displacement by cotter pins 16. The lower side truck frame member 10ª is slotted longitudinally so as to permit a swinging motion of the hanger 8, the slot being sufficiently wide to permit a slight lateral movement. By arranging the supporting springs between the wheels and approximately at or near the points where the side bearings are usually located, I am enabled to dispense with the center bearings and still obtain the necessary freedom of movement of the car body incident to taking curves or leaving curves and running onto a straight track. The universal movement of the hangers supported by opposite side truck frames will permit a certain, though limited, extent of movement of the car body,—the confinement of the hangers preventing any undue displacement thereof. The wheel axles are intended to be provided with the usual collars and they will preserve the alinement of the truck side frames.

I claim:

1. A car truck comprising truck side frames each supporting a hanger, said hangers in turn supporting a truck bolster, said bolster in turn yieldingly supporting a car body at points inside the car wheels of the truck and there being permitted a universal movement between said bolster and said truck side frames.

2. In a car truck, the combination of side frames, a bolster suspended therebetween and having a universal movement relative thereto, a car underframe, and supporting springs interposed between said underframing and said bolster.

3. A car truck comprising two side frames, a bolster supported therebetween and capable of universal movement relative thereto, said bolster being provided with a spring seat, springs on said seat for supporting the underframing of the car, and telescopic connections between said spring seats and the underframing of the car.

4. A truck side frame having an opening or recess to receive the end of a bolster, the upper portion of said side frame having a centrally arranged hanger seat and that portion of said frame below the bolster opening being slotted or recessed lengthwise to receive and permit movement of the bolster hanger, said truck side frame being combined with a hanger which latter supports a truck bolster.

5. In a car truck, the combination with a bolster having a spherical bearing seat, a hanger for supporting said bolster, said hanger being capable of universal movement and provided with a removable spherical collar which latter coöperates with a bearing seat of the bolster.

6. A car truck comprising side frames in the form of castings in the upper portion of which are suspended hangers capable of universal movement, there being recesses or openings in said castings through which said hangers pass for supporting the truck bolster arranged in said recesses, said truck bolster having spring seats on which are arranged springs for supporting the car body, said springs being located within the wheels of the truck and adjacent to said hangers.

7. In a car truck, a pair of side frames, a hanger pivotally connected to the central portion of each side frame and depending therefrom, a truck bolster supported by said hanger and having universal joint connections therewith, and a body bolster yieldingly supported by said truck bolster.

8. In a car truck, a pair of side frames, a truck bolster suspended from and arranged between said side frames, springs on said truck bolster at points between the wheels of the truck, and a body bolster supported by said springs.

In testimony whereof I hereunto affix my signature this 22nd day of November, 1917.

CHARLES T. WESTLAKE.